Sept. 30, 1924.                    E. H. SCHMIDT                    1,510,016
                              SHOCK ABSORBING MECHANISM
                              Original Filed Oct. 16, 1922
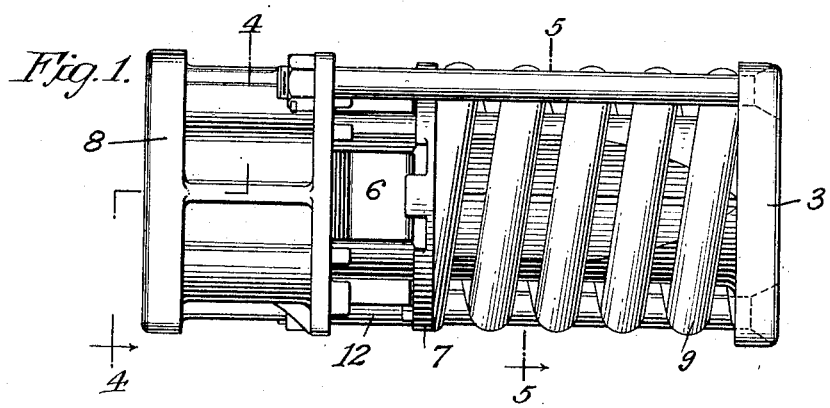
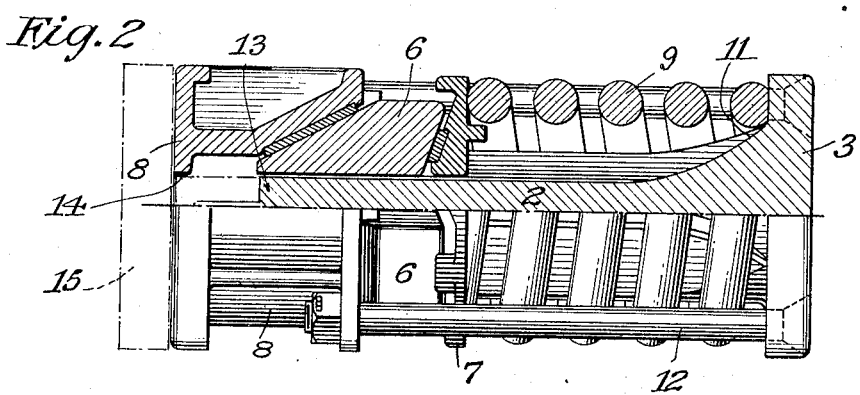
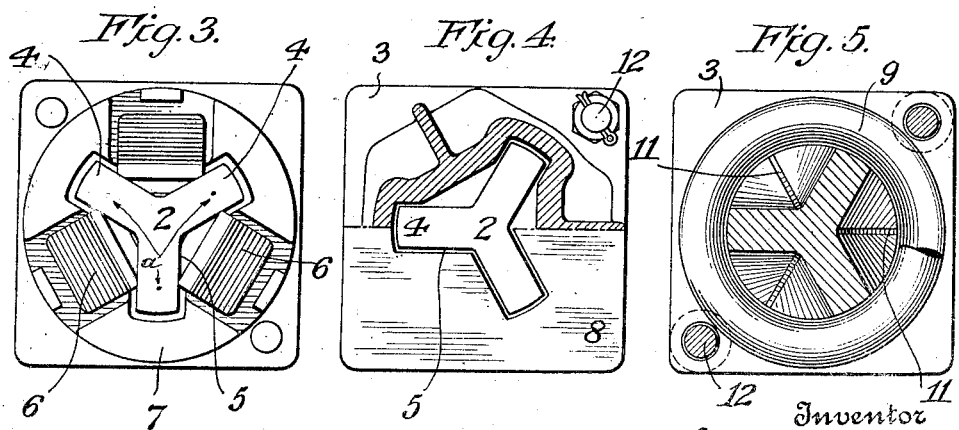
Inventor
Ernest H. Schmidt
By his Attorney Patented Sept. 30, 1924.

1,510,016

UNITED STATES PATENT OFFICE.

ERNEST H. SCHMIDT, OF CLEVELAND, OHIO, ASSIGNOR, BY MESNE ASSIGNMENTS, TO NATIONAL MALLEABLE AND STEEL CASTINGS COMPANY, OF CLEVELAND, OHIO, A CORPORATION OF OHIO.

SHOCK-ABSORBING MECHANISM.

Application filed October 16, 1922, Serial No. 594,674. Renewed May 9, 1924.

*To all whom it may concern:*

Be it known that I, ERNEST H. SCHMIDT, a citizen of the United States, residing at Cleveland, Cuyahoga County, Ohio, have invented new and useful Improvements in Shock-Absorbing Mechanisms, of which the following is a specification, reference being had to the accompanying drawings, in which—

Fig. 1 is a plan of my improved mechanism; Fig. 2 is an elevation thereof partly in section, Fig. 3 is an end elevation of the mechanism with the wedge follower removed; and Figs. 4 and 5 are sections, respectively, on lines 4—4 and 5—5 of Fig. 1.

My invention relates to shock absorbing mechanism and particularly to friction draft gears for railway vehicles of the type shown in Letters Patent No. 1,301,809 of C. K. Brooks and E. H. Schmidt, granted April 29, 1919. My improvement consists in lightening the gear, in making it more compact, and at the same time in so reinforcing it that it will withstand the heavy stresses found in service. My invention also comprises the various features which I shall hereinafter describe and claim.

Referring to the drawings, 2 indicates the central friction member having a broad base of resistance 3, and outwardly radiating arms 4 with re-entrant angles between them, which have friction faces 5 intended to be engaged by the friction shoes 6. The friction shoes 6 bear at their inner ends against an intermediate follower 7 and at their outer ends against a wedge follower 8. Encircling the central friction member 2 is a compression spring 9 which at its ends bears respectively against the base 3 and the intermediate follower 7.

The wedge 8 has a central aperture 14 through which the end 13 of the central friction member moves into engagement with a follower 15 just before the spring 9 goes solid, so that over solid blows are thus taken up directly from the central member by the follower 15, and the various parts of the friction mechanism and spring are thereby protected from injury.

To provide the outwardly radiating arms 4 of the central friction member 2 with sufficient strength to take up the over solid blows imposed on the gear in buff or draft, the arms 4 extend outwardly beyond the faces 5 which are engaged by the friction shoes, thus giving an additional amount of metal to assist in carrying the heavy stresses when the gear goes solid. This reinforcement to the arms 4 is indicated in Fig. 3 as that portion of the arms which extends outside of the points $a$. The gear is also reinforced by flaring the stem of the central member outwardly at 11 near the base, so that the extensions on the arms 4 merge thereinto at their rear ends, and carry the stresses as nearly to the edges of the base as possible.

The gear is held together by two retaining rods 12 which seat in apertures in base and wedge in diagonally opposite corners of the gear.

My improved gear, because of its ruggedness as well as its compactness and lightness, is particularly adapted for use in passenger car and light freight service.

The terms and expressions which I have employed are used as terms of description and not of limitation, and I have no intention, in the use of such terms and expressions, of excluding any mechanical equivalents of the features shown and described, or portions thereof, but recognize that various modifications are possible within the scope of the invention claimed.

What I claim is:

1. A shock absorbing mechanism, a central friction member having outwardly radiating arms, friction shoes arranged between said arms and having a friction bearing thereon, said arms extending outwardly beyond the zone in which the shoes bear to reinforce the mechanism to resist buffing and draft stresses, a compression spring arranged between said shoes and a portion of said central member to resist the travel of the shoes along said central member and increase the friction therebetween, a follower wedge bearing upon said shoes, and a limiting stop against which the central friction member comes into bearing to protect the mechanism against over solid blows.

2. In shock absorbing mechanism, a central friction member having outwardly radiating arms, friction shoes arranged between said arms and engaging friction faces thereon, a compression spring arranged between said shoes and a portion of said central member to resist the travel of the shoes along said central member and increase the friction therebetween, a follower wedge engaging said shoes, and a limiting stop having a direct bearing against the end of the central member to limit the compression of the mechanism, the arms having reinforcing portions extending radially beyond the friction faces arranged to assist in withstanding service stresses imposed on the gear.

3. In shock absorbing mechanism, a central friction member having outwardly radiating arms and a broad base, friction shoes arranged between said arms and engaging friction faces thereon, a compression spring arranged between said shoes and a portion of said central member to resist the travel of the shoes along said central member and increase the friction therebetween, a follower wedge engaging said shoes, and a limiting stop having a direct bearing against the end of the central member to limit the compression of the mechanism, the arms having reinforcing portions extending radially beyond the friction faces and merging at their rear ends in the outwardly flaring stem of the central member where it joins the base, said reinforcing portions and the flaring stem being arranged to assist in withstanding service stresses imposed on the gear.

4. In shock absorbing mechanism, a central friction member having outwardly radiating arms and a broad base, friction shoes arranged between said arms and engaging friction faces thereof, spring means arranged in compression between said shoes and a portion of said base to resist the travel of the shoes along said central member and increase the friction therebetween, a follower wedge engaging said shoes and apertured to permit the end of the central member to pass through the wedge into bearing with a pressure transmitting member to limit the compression of the device, said wedge also having a radially arranged outwardly extending reinforcing rib opposite that part of the wedge against which each friction shoe bears.

5. In shock absorbing mechanism, a central friction member having outwardly radiating arms, friction shoes arranged between said arms and engaging friction faces thereon, a compression spring arranged between said shoes and a portion of said central member to resist the travel of the shoes along said central member and increase the friction therebetween, a follower wedge engaging said shoes, and a limiting stop having a direct bearing against the end of the central member to limit the compression of the mechanism, the arms having reinforcing portions extending radially beyond the zone required for frictional contact and carrying the stresses of over-solid blows in addition to frictional stresses.

ERNEST H. SCHMIDT.